(12) United States Patent
Yamazaki

(10) Patent No.: US 8,351,733 B2
(45) Date of Patent: Jan. 8, 2013

(54) IMAGE SHARPENING PROCESSING DEVICE, METHOD, AND SOFTWARE

(75) Inventor: Hidetoshi Yamazaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 353 days.

(21) Appl. No.: 12/865,973

(22) PCT Filed: Dec. 24, 2008

(86) PCT No.: PCT/JP2008/073383
§ 371 (c)(1),
(2), (4) Date: Aug. 3, 2010

(87) PCT Pub. No.: WO2009/098830
PCT Pub. Date: Aug. 13, 2009

(65) Prior Publication Data
US 2010/0329581 A1 Dec. 30, 2010

(30) Foreign Application Priority Data
Feb. 4, 2008 (JP) .................................. 2008-024225

(51) Int. Cl.
*G06K 9/40* (2006.01)
*G06K 9/38* (2006.01)
(52) U.S. Cl. ........ 382/266; 382/260; 382/263; 382/264; 382/270; 382/274
(58) Field of Classification Search .................. 382/260, 382/263, 264, 266, 270, 274
See application file for complete search history.

(56) References Cited

U.S. PATENT DOCUMENTS
5,087,972 A 2/1992 Sumi
6,856,704 B1 2/2005 Gallagher et al.
(Continued)

FOREIGN PATENT DOCUMENTS
| EP | 1 612 729 A1 | 1/2006 |
| EP | 1 667 066 A1 | 6/2006 |
| JP | 1-259464 A | 10/1989 |
| JP | 2-275589 A | 11/1990 |
| JP | 5-237083 A | 9/1993 |
| JP | 7-327152 A | 12/1995 |
| JP | 9-294220 A | 11/1997 |
| JP | 11-98364 A | 4/1999 |
| JP | 2001-346222 A | 12/2001 |

(Continued)

OTHER PUBLICATIONS

Supplementary European Search Report for corresponding EP application No. 08872187.3, dated Jul. 9, 2012.

*Primary Examiner* — Anand Bhatnagar
*Assistant Examiner* — Soo Park
(74) *Attorney, Agent, or Firm* — Birch, Stewart, Kolasch & Birch, LLP

(57) ABSTRACT

Provided is an image sharpening processing device capable of performing image sharpening processing by changing only luminance without changing a hue. The image sharpening processing device includes: a smoothing means for smoothing luminance of an input image and thus obtaining a smoothed image; a subtraction means for subtracting the smoothed image from the luminance of the input image and thus obtaining a difference image; a luminance-linked gain calculation means for calculating a luminance-linked gain from the input image; a first multiplication means for multiplying the difference image by the luminance-linked gain and thus obtaining a multiplication result; an addition means for adding the multiplication result to the luminance of the input image and thus obtaining luminance of an output image; a color difference gain calculation means for calculating a color difference gain from a color difference of the input image and the luminance-linked gain; and a second multiplication means for multiplying the color difference of the input image by the color difference gain and thus obtaining a color difference of the output image.

9 Claims, 4 Drawing Sheets

U.S. PATENT DOCUMENTS

| | | | |
|---|---|---|---|
| 7,106,386 B2 * | 9/2006 | Kobayashi | 348/625 |
| 7,880,814 B2 * | 2/2011 | Yamashita et al. | 348/678 |
| 7,970,234 B2 * | 6/2011 | Park et al. | 382/275 |
| 8,036,481 B2 * | 10/2011 | Sakurai et al. | 382/255 |
| 8,094,205 B2 * | 1/2012 | Watanabe | 348/222.1 |
| 8,155,434 B2 * | 4/2012 | Kerofsky et al. | 382/162 |
| 2001/0038716 A1 * | 11/2001 | Tsuchiya et al. | 382/261 |
| 2002/0149685 A1 * | 10/2002 | Kobayashi et al. | 348/252 |
| 2004/0085459 A1 | 5/2004 | Hoshuyama et al. | |
| 2005/0069216 A1 | 3/2005 | Chien | |
| 2005/0094890 A1 * | 5/2005 | Wang | 382/266 |
| 2005/0185223 A1 | 8/2005 | Takahashi et al. | |
| 2005/0200760 A1 | 9/2005 | Nakakuki | |
| 2006/0115152 A1 * | 6/2006 | Tsuchiya | 382/169 |
| 2007/0080975 A1 | 4/2007 | Yamashita et al. | |
| 2007/0092139 A1 * | 4/2007 | Daly | 382/169 |
| 2007/0098294 A1 * | 5/2007 | Xu et al. | 382/264 |
| 2007/0109447 A1 | 5/2007 | Yamashita et al. | |

FOREIGN PATENT DOCUMENTS

| | | |
|---|---|---|
| JP | 2002-133409 A | 5/2002 |
| JP | 2003-101783 A | 4/2003 |
| JP | 2003-235050 A | 8/2003 |
| JP | 2005-210442 A | 8/2005 |
| JP | 2005-260517 A | 9/2005 |
| JP | 2005-312008 A | 11/2005 |
| JP | 2006-33212 A | 2/2006 |
| JP | 2007-312349 A | 11/2007 |

* cited by examiner

IMAGE SHARPENING PROCESSING DEVICE, METHOD, AND SOFTWARE

TECHNICAL FIELD

The present invention relates to image processing of an image displaying, printing, representing, photographing, or recording device. For example, the present invention relates to an image sharpening processing device, method, and software.

BACKGROUND ART

As a simple linear operator usable for improving a blur image, there is an unsharp masking (UM) technique (refer to A. K. Jain (1989), "*Fundamentals of Digital Image Processing*," Prentice Hall, Inc., Englewood Cliffs, N.J. (Non-Patent Document 1)). The unsharp masking technique takes advantage of a characteristic of human visual system, called Mach band effect. This characteristic brings a visual phenomenon that perceived luminance of regions adjacent to each other depends on sharpness of a transition portion. Taking advantage of this characteristic, the sharpness of an image can be improved by introducing a larger number of apparent changes between image regions. The basic idea of unsharp masking technique is to subtract, from an input signal, a signal obtained by filtering the input signal through a low-pass filter.

FIG. 6 is a block diagram showing an example of a configuration of a conventional unsharp masking device for performing the above-described unsharp masking technique. An unsharp masking device 11 includes: a smoothing means 12 for smoothing luminance of an input image and then supplying the smoothed image to a subtraction means 13; the subtraction means 13 for calculating a difference image by subtracting the smoothed image from the luminance of the input image, and then supplying the difference image to a multiplication means 14; the multiplication means 14 for multiplying the difference image by a constant number and then supplying the multiplication result to an addition means 15; and the addition means 15 for adding the multiplication result to the luminance of the input image and then outputting luminance of an output image.

Various types of edge enhancement processing using the unsharp masking technique exist. Examples of the edge enhancement processing include sharpening by use of Laplacian (refer to pp. 58 to 59, and pp. 72 to 73 in TSUCHIYA, Yutaka and FUKADA, Youji, "*Image Processing*," the Institute of Image Information and Television Engineers Reference Book Series, Corona Publishing Co., Ltd, ISBN4-339-01070-7 (Non-Patent Document 2)), and crispening (disclosed in FIGS. 1 and 2 of Japanese Patent Application Publication No. Sho 52-266116 (Patent Document 1)).

Patent Document 1: Japanese Patent Application Publication No. Sho 52-266116 Non-Patent Document 1: A. K. Jain (1989), "*Fundamentals of Digital Image Processing*," Prentice Hall, Inc., Englewood Cliffs, N.J. Non-Patent Document 2: TSUCHIYA, Yutaka and FUKADA, Youji, "*Image Processing*," the Institute of Image Information and Television Engineers Reference Book Series, Corona Publishing Co., Ltd, ISBN4-339-01070-7

DISCLOSURE OF THE INVENTION

Problems to be Solved by the Invention

The aforementioned conventional examples have a problem, however. Specifically, even when image processing is desired to be performed by changing only luminance, saturation also exceeds a range representable by a representing device such as a display or a printer. Accordingly, the saturation is adjusted to be in the representable range in this case, thereby leading to change in hue as well.

In addition, there is another problem that is common to the unsharp masking technique. Specifically, the problem is that bright and dark bands are produced around a high contrast edge (banding). An unsharp (round) (low frequency) component makes a sharp edge signal rounded, and thus produces a smooth edge. Accordingly, a difference signal (high frequency component) between the original image and the unsharp image contains overshoot and undershoot around the sharp edge. When this difference signal is added again to a low frequency component whose dynamic range has been compressed, uncompressed or amplified overshoot and undershoot signals existing around the sharp edge produce a blight band and a dark band near the edge. Such artifacts are called edge banding artifacts because the artifacts are more clearly observed near a high contrast edge. The edge banding artifacts are extremely undesired artifacts in images generated in consumer products. To make the artifacts visually unperceivable, the artifacts need to be distributed in a sufficiently wide area, which brings about the need for a large filter. As a result, there arises a problem of an increase in cost due to an increase in the number of line memories in the smoothing means.

The present invention is made in consideration of the aforementioned conventional problems. The present invention thus provides an image sharpening processing device for solving the aforementioned problems. The present invention also provides an image sharpening processing method and software.

Means for Solving the Problems

An image sharpening processing device of the present invention is characterized by including a smoothing means for smoothing luminance of an input image and thus obtaining a smoothed image; a subtraction means for subtracting the smoothed image from the luminance of the input image and thus obtaining a difference image; a luminance-linked gain calculation means for calculating a luminance-linked gain from the input image; a first multiplication means for multiplying the difference image by the luminance-linked gain and thus obtaining a multiplication result; an addition means for adding the multiplication result to the luminance of the input image and thus obtaining luminance of an output image; a color difference gain calculation means for calculating a color difference gain from a color difference of the input image and the luminance-linked gain; and a second multiplication means for multiplying the color difference of the input image by the color difference gain and thus obtaining a color difference of the output image. In this manner, the image sharpening processing device of the present invention can perform the sharpening processing by changing only luminance without changing a hue.

It is preferable that the luminance-linked gain calculation means calculates the luminance-linked gain in such a way as to obtain the luminance of the output image in which a U gain is smaller than an L gain.

The smoothing means may use an IIR filter for previous lines thereby to use a signal line memory for the previous line, and may be set to satisfy $$Newpre = \frac{(cur \cdot N + pre \cdot M)}{M + N}, \quad \text{[Equation 1]}$$

where: cur represents a current line; pre represents a previous line; Newpre represents a new previous line; N represents a ratio of the current line; and M represents a ratio of the previous line. In this manner, the number of line memories can be reduced.

The luminance-linked gain calculation means may calculate gains for all luminance values of the input image.

The luminance-linked gain calculation means may divide luminance values of the input image into a plurality of ranges, may set setting values in the respective ranges, and may calculate a gain by performing interpolation therebetween.

The color difference gain calculation means may calculate a color difference gain in such a way that, in a color space represented by luminance and color difference in which Cb and Cr represent color differences of the input image; Y represents luminance of the input image; $Cb_{unsharp}$ and $Cr_{unsharp}$ represent color differences of the output image; $Y_{unsharp}$ represents luminance of the output image; (x, y) represents a point at which saturation is highest on a straight line passing through (Cb, Cr) and an origin and having the same hue as the input image; (Cb0, Cr0) and (Cb1, Cr1) respectively represent highest saturations of first and second primary colors forming the input image; Y0 and Y1 represent luminance; and θ represents an angle formed by an axis of Cb and the straight line passing through the origin and (Cb, Cr), the following equations are true:

$$y = \frac{Cr1 - Cr0}{Cb1 - Cb0} \cdot (x - Cb0) + Cr0 \quad \text{[Equation 2]}$$

$$y = \frac{Cr}{Cb} x$$

$$\frac{Cr}{Cb} x = \frac{Cr1 - Cr0}{Cb1 - Cb0} \cdot (x - Cb0) + Cr0$$

$$\left(\frac{Cr}{Cb} - \frac{Cr1 - Cr0}{Cb1 - Cb0}\right) \cdot x = -\frac{Cr1 - Cr0}{Cb1 - Cb0} \cdot Cb0 + Cr0$$

$$x = \frac{-\frac{Cr1 - Cr0}{Cb1 - Cb0} \cdot Cb0 + Cr0}{\frac{Cr}{Cb} - \frac{Cr1 - Cr0}{Cb1 - Cb0}}$$

$$= \frac{Cb(-Cr1 Cb0 + Cr0 Cb0 + Cb1 Cr0 - Cb0 Cr0)}{Cr(Cb1 - Cb0) - Cb(Cr1 - Cr0)};$$

a ratio at which the point (x, y) divides a line segment (Cb0, Cr0)-(Cb1, Cr1) is expressed by:

$$\text{ratio} = \frac{x - Cb0}{Cb1 - Cb0}; \quad \text{[Equation 3]}$$

luminance Yr at the point (x, y) is expressed by;

$$Yr = Y0 + (Y1 - Y0) \times \text{ratio},$$

then $$\alpha = \frac{Y - 1}{\sqrt{Cb^2 + Cr^2}} \quad \text{[Equation 4]}$$

$$Yr = \alpha \cdot xr + 1$$

$$xr = \frac{Yr - 1}{\alpha} = \frac{(Yr - 1)\sqrt{Cb^2 + Cr^2}}{Y - 1}$$

where $Y > Yr$, or $$\alpha = \frac{Y}{\sqrt{Cb^2 + Cr^2}} \quad \text{[Equation 5]}$$

$$Yr = \alpha \cdot xr$$

$$xr = \frac{Yr}{\alpha} = \frac{Yr\sqrt{Cb^2 + Cr^2}}{Y}$$

where $Y < Yr$;

when $Y_{diff}$ represents a luminance change from the input image to the output image, $Y_{unsharp} = Y Y_{diff}$, then $$\beta = \frac{xr}{1 - Yr} \quad \text{[Equation 6]}$$

$$r_{unsharp} = \beta \cdot (Y_{unsharp} - Yr) + xr$$

where $Y_{unsharp} > Yr$, or $$\beta = \frac{xr}{Yr} \quad \text{[Equation 7]}$$

$$r_{unsharp} = \beta \cdot Y_{unsharp} = \frac{xr}{Yr} \cdot Y_{unsharp}$$

where $Y_{unsharp} < Yr$; and $$\sin\theta = \frac{Cr}{\sqrt{Cb^2 + Cr^2}} \quad \text{[Equation 8]}$$

$$\cos\theta = \frac{Cb}{\sqrt{Cb^2 + Cr^2}}$$

$$Cb_{unsharp} = r_{unsharp} \cos\theta = r_{unsharp} \cdot \frac{Cb}{\sqrt{Cb^2 + Cr^2}}$$

$$Cr_{unsharp} = r_{unsharp} \sin\theta = r_{unsharp} \cdot \frac{Cr}{\sqrt{Cb^2 + Cr^2}}.$$

In summary, the color difference gain calculation means may calculate a color difference gain so as to satisfy:

$$Cb_{unsharp} = |Y_{diff}| \cdot (1 + Cb\text{gain}) \cdot (\text{sign of } Y_{diff}) \cdot Cb$$

$$Cr_{unsharp} = |Y_{diff}| \cdot (1 + Cr\text{gain}) \cdot (\text{sign of } Y_{diff}) \cdot Cr \quad \text{[Equation 9]},$$

where, in a color space represented by luminance and color difference, Cb and Cr represent color differences of the input image; $Cb_{unsharp}$ and $Cr_{unsharp}$ represent color differences of the output image; $Y_{diff}$ represents a luminance change from the input image to the output image; and $Cb_{gain}$ and $Cr_{gain}$ represent constant numbers.

Effects of the Invention

The image sharpening processing device of the present invention can perform sharpening processing by changing only luminance without changing a hue.

DESCRIPTION OF SYMBOLS

| | Description of Symbols |
|---|---|
| 1 | Image Sharpening Processing Device |
| 2, 12 | Smoothing Means |
| 3 | Luminance-Linked Gain Calculation Means |
| 4 | Color Difference Gain Calculation Means |
| 5, 13 | Subtraction Means |
| 6, 8, 14 | Multiplication Means |
| 7, 15 | Addition Means |
| 11 | Unsharp Masking Device |

BEST MODES FOR CARRYING OUT THE INVENTION

Embodiment 1

Figure 1:
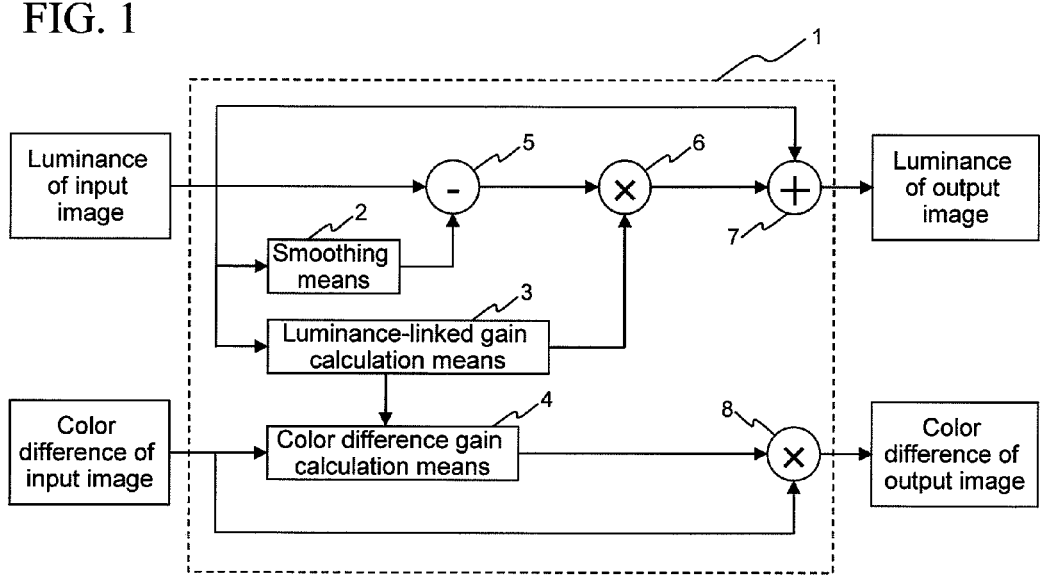
FIG. 1 is a block diagram showing an example of a configuration of an image sharpening processing device of the present invention.

FIG. 1 is a block diagram showing an example of a configuration of an image sharpening processing device of the present invention. An image sharpening processing device 1 includes: a smoothing means 2 for smoothing luminance of an input image and then supplying the smoothed image to a subtraction means 5; a luminance-linked gain calculation means 3 for calculating a luminance-linked gain from the luminance of the input image and then supplying the luminance-linked gain to a color difference gain calculation means 4 and a multiplication means 6; the color difference gain calculation means 4 for calculating a color difference gain from a color difference of the input image and the luminance-linked gain and then supplying the calculated color difference gain to a multiplication means 8; the subtraction means 5 for calculating a difference image by subtracting the smoothed image from the luminance of the input image, and then supplying the calculated difference image to the multiplication means 6; the multiplication means 6 for multiplying the difference image by the luminance-linked gain and then supplying the multiplication result to an addition means 7; the addition means 7 for adding the multiplication result to the luminance of the input image and then outputting luminance of an output image; and the multiplication means 8 for multiplying the color difference gain by the color difference of the input image and then outputting a color difference of the output image.

Figure 2:
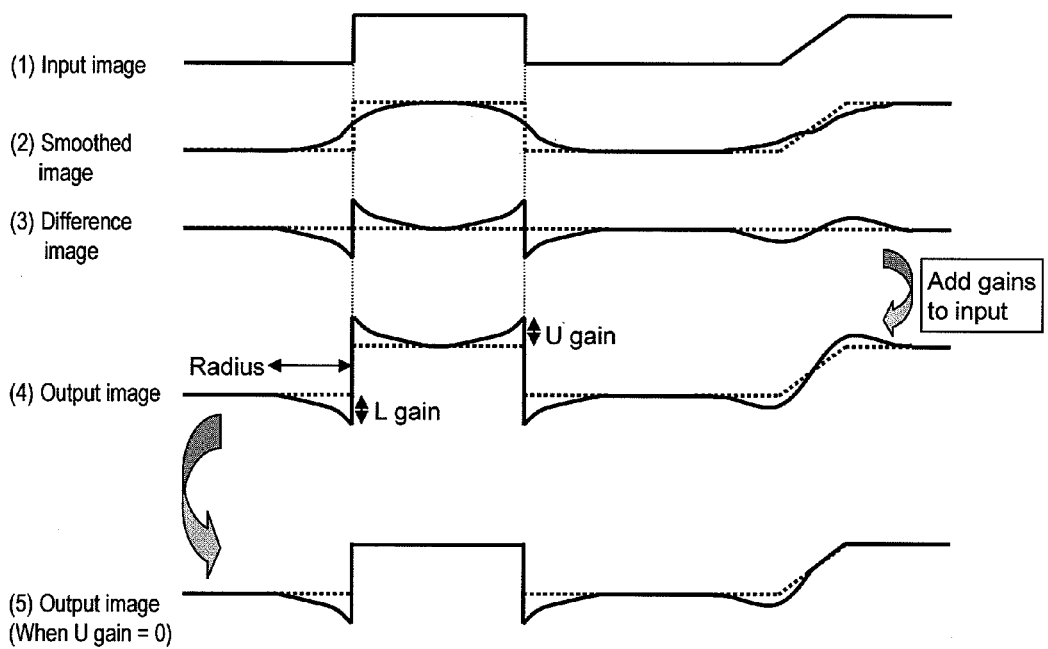
FIG. 2 is a diagram showing waveforms of process images in an image sharpening processing device 1 of FIG. 1.

FIG. 2 is a diagram showing waveforms of process images in the image sharpening processing device 1 of FIG. 1. A flow of basic unsharp mask processing will be described with reference to FIG. 2. The waveform denoted by (1) is a luminance waveform of an input image. The waveform denoted by (2) is a waveform of a smoothed image (waveform of a blur image) obtainable by smoothing (1). The waveform denoted by (3) is a waveform of a difference image obtained by subtracting (2) from (1). The waveform denoted by (4) is a luminance waveform of an output image obtainable by multiplying (3) by a luminance-linked gain and then adding (1) thereto. A gain whose difference waveform is on a positive side is called a U gain while a gain whose difference waveform is on a negative side is called an L gain. Setting a U gain to 0 can prevent the waveform from changing in the upper direction. The waveform denoted by (5) is a luminance waveform of an output image when the U gain is set to 0. When the luminance-linked gain calculation means divides the luminance value of an input image into multiple segments and then interpolates each luminance value by placing a setting value for each of the segments for the purpose of setting the U gain to 0, the luminance-linked gain calculation means sets the basic gain to 0 and also sets the change amount to 0 for all the segments. Although setting the U gain to 0 is not the best practice, it is generally preferable that the U gain is set to be smaller than the L gain.

Figure 3:
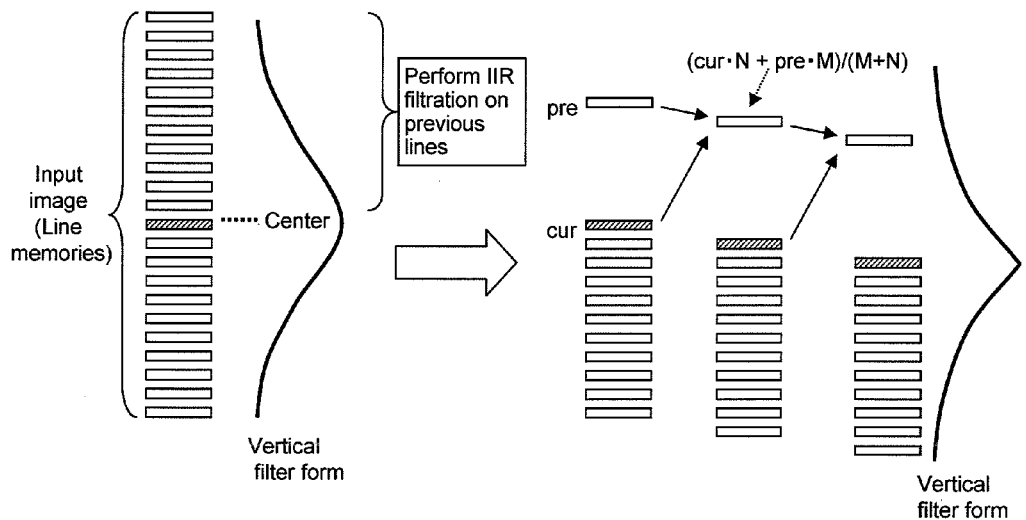
FIG. 3 is a diagram describing a line memory reduction method.

In the smoothing means 2 of FIG. 1, for the purpose of reducing band artifacts, a filter having a large number of taps is needed in an FIR (Finite Impulse Response) filter. For this reason, the number of line memories increases inevitably, which in turns leads to an increase in cost. To avoid this, an IIR (Infinite Impulse Response) filter is used for previous lines. In this case, a single line memory is used for the resultant previous line and thereby the number of line members can be reduced. FIG. 3 is a diagram describing such a line memory reduction method. The current line (cur) and the previous line (pre) are set in Equation 10 to describe a new previous line (New pre).

$$Newpre = \frac{(cur \cdot N + pre \cdot M)}{M + N} \qquad [\text{Equation 10}]$$

Here, N represents a ratio of the current line, and M represents a ratio of the previous line. Note that, an FIR filter is used for processing future lines.

Figure 4:
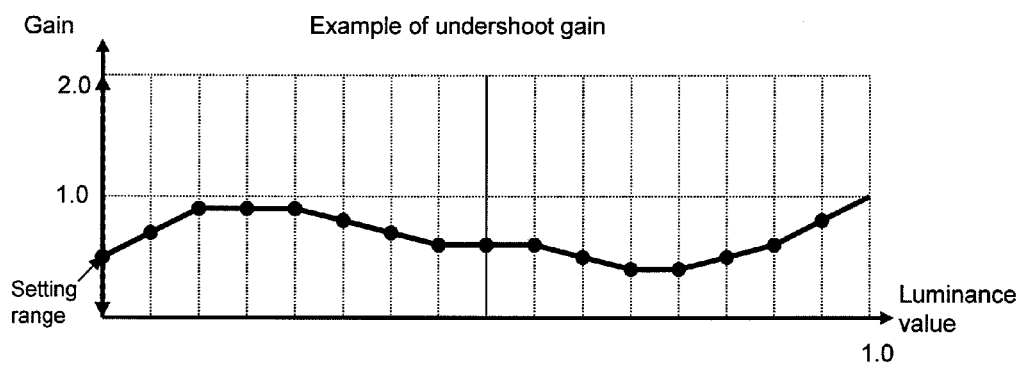
FIG. 4 is a graph describing an example of setting of a luminance-linked gain in a luminance-linked gain calculation means 3 of FIG. 1.

FIG. 4 is a graph describing an example of setting of a luminance-linked gain in the luminance-linked gain calculation means 3 of FIG. 1. The luminance-linked gain calculation means 3 causes a gain to change in accordance with a luminance value Y of an input image. For example, the luminance-linked gain calculation means 3 may perform conversion by holding gains for all luminance values, but also, as shown in FIG. 4, may divide a luminance value into multiple segments, sets setting values in the respective segments, and calculates a gain by performing interpolation therebetween.

Figure 5:
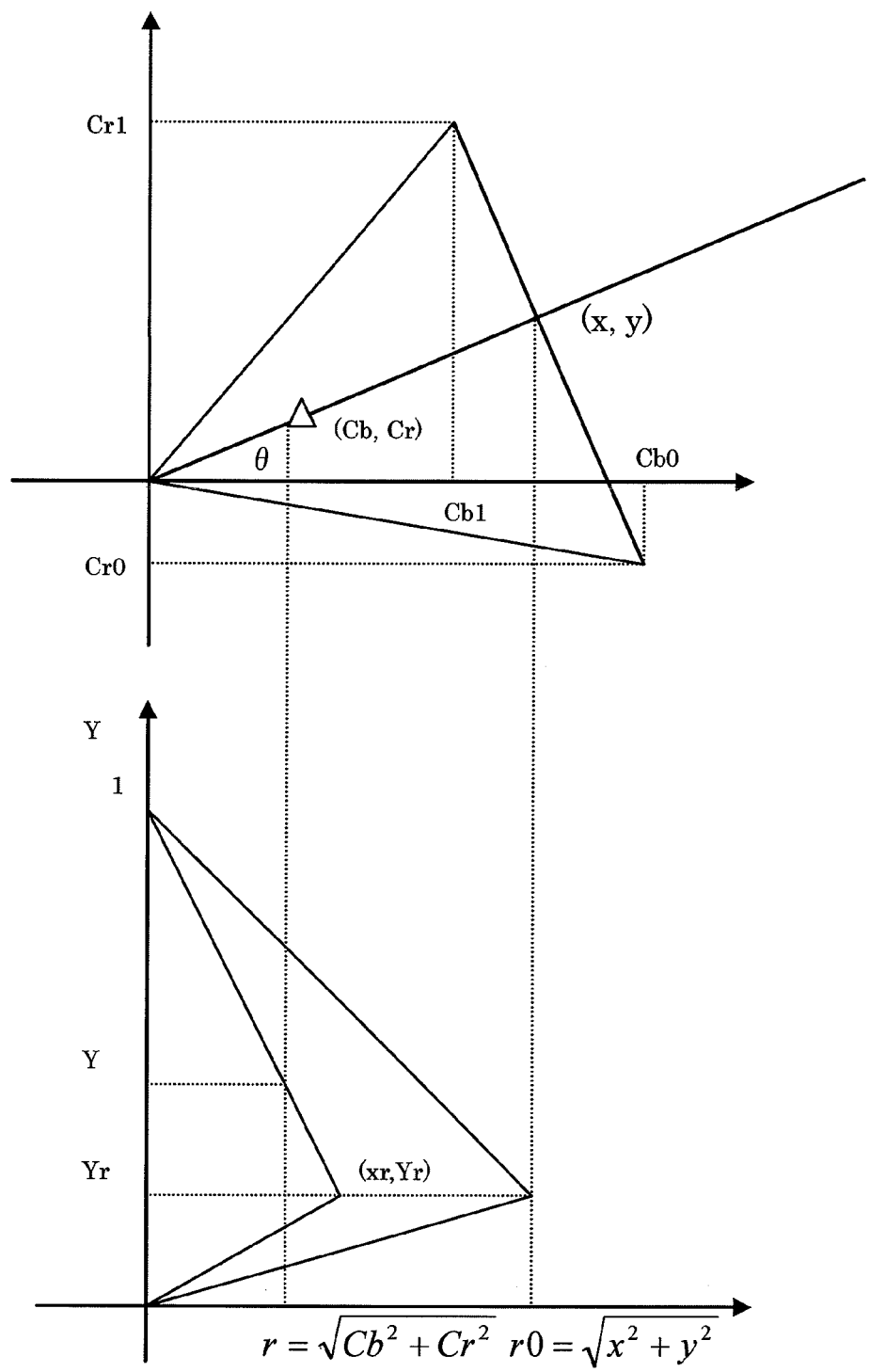
FIG. 5 is a graph describing a color difference gain calculation in a color difference gain calculation means 4 of FIG. 1.
Figure 6:
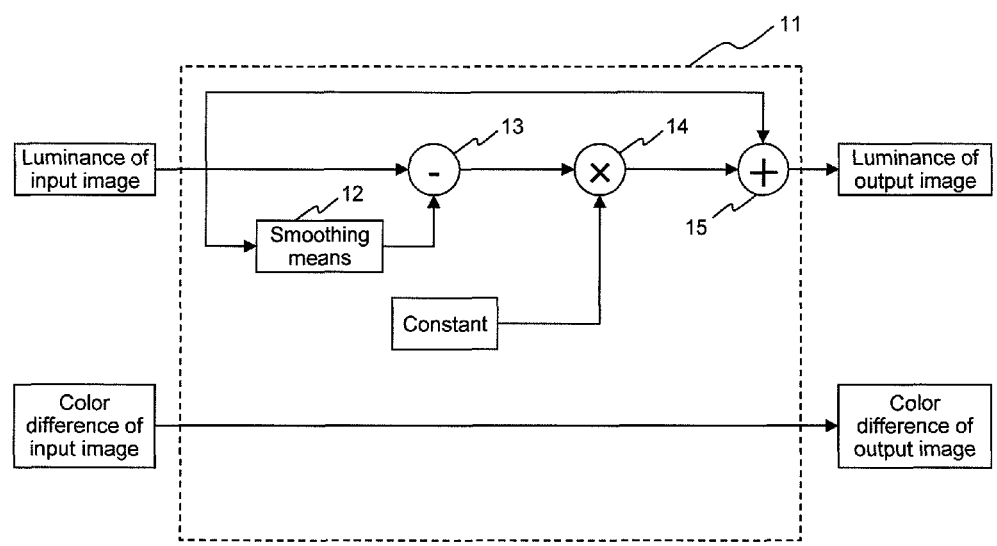
FIG. 6 is a block diagram showing an example of a configuration of a conventional unsharp masking device.

FIG. 5 is a graph describing a color difference gain calculation in the color difference gain calculation means 4 of FIG. 1. The color difference gain calculation means 4 and the multiplication means 8 perform the calculation in the manner described below.

In a color space represented by luminance (Y) and color difference (Cb, Cr), six primary colors (yellow, cyan, magenta, green, red, and blue) show a hexagonal shape in a graph using Cb and Cr as the axis. When a portion between blue and magenta is taken as an example, an upper portion of the graph in FIG. 5 corresponds to the portion.

Here, suppose that an input image of (Cb, Cr) shown by a triangular figure in the upper portion of FIG. 5 is obtained. Then, consider a point corresponding to the same hue, i.e., a point (x, y) which is on a straight line passing through the origin and (Cb, Cr), and at which the saturation is the highest (distant from the origin) on the straight line. In this case, a point where the saturation is higher than the primary color blue (Cb0, Cr1) and the primary color magenta (Cb1, Cr1) is not representable. A color which is the intermediate color of these and which has the highest saturation lies on a straight line connecting the two primary colors (Cb0, Cr0)-(Cb1, Cr1). Thus, the point can be obtained by Equation 11.

$$y = \frac{Cr1 - Cr0}{Cb1 - Cb0} \cdot (x - Cb0) + Cr0 \quad \text{[Equation 11]}$$

$$y = \frac{Cr}{Cb}x$$

$$\frac{Cr}{Cb}x = \frac{Cr1 - Cr0}{Cb1 - Cb0} \cdot (x - Cb0) + Cr0$$

$$\left(\frac{Cr}{Cb} - \frac{Cr1 - Cr0}{Cb1 - Cb0}\right) \cdot x = -\frac{Cr1 - Cr0}{Cb1 - Cb0} \cdot Cb0 + Cr0$$

$$x = \frac{-\frac{Cr1 - Cr0}{Cb1 - Cb0} \cdot Cb0 + Cr0}{\frac{Cr}{Cb} - \frac{Cr1 - Cr0}{Cb1 - Cb0}}$$

$$= \frac{Cb(-Cr1Cb0 + Cr0Cb0 + Cb1Cr0 - Cb0Cr0)}{Cr(Cb1 - Cb0) - Cb(Cr1 - Cr0)}$$

In addition, considering at what ratio the point (x, y) divides the line segment (Cb0, Cr0)-(Cb1, Cr1), the ratio is described by Equation 12.

$$\text{ratio} = \frac{x - Cb0}{Cb1 - Cb0} \quad \text{[Equation 12]}$$

Further, when the luminance of the primary color blue is set to Y0 and the luminance of the primary color magenta is set to Y1, luminance Yr at the point (x, y) is described by the following equation.

$$Yr = Y0 + (Y1 - Y0) \times \text{ratio}$$

The luminance with which the saturation on the straight line (the same hue) passing through the point (Cb, Cr) indicated by the triangular figure and the origin becomes the maximum is Yr.

When Y>Yr with respect to an input image (Y, Cb, Cr), the following equations are true.

$$\alpha = \frac{Y - 1}{\sqrt{Cb^2 + Cr^2}} \quad \text{[Equation 13]}$$

$$Yr = \alpha \cdot xr + 1$$

$$xr = \frac{Yr - 1}{\alpha} = \frac{(Yr - 1)\sqrt{Cb^2 + Cr^2}}{Y - 1}$$

Further, when Y<Yr, the following equations are true.

$$\alpha = \frac{Y}{\sqrt{Cb^2 + Cr^2}} \quad \text{[Equation 14]}$$

$$Yr = \alpha \cdot xr$$

$$xr = \frac{Yr}{\alpha} = \frac{Yr\sqrt{Cb^2 + Cr^2}}{Y}$$

In addition, when a change $Y_{\text{diff}}$ of luminance is used, the following equation is true.

$$Y_{\text{unsharp}} = Y + Y_{\text{diff}}$$

Further, when $Y_{\text{unsharp}} > Yr$, the following equations are true.

$$\beta = \frac{xr}{1 - Yr} \quad \text{[Equation 15]}$$

$$r_{\text{unsharp}} = \beta \cdot (Y_{\text{unsharp}} - Yr) + xr$$

Further, when $Y_{\text{unsharp}} < Yr$, the following equations are true.

$$\beta = \frac{xr}{Yr} \quad \text{[Equation 16]}$$

$$r_{\text{unsharp}} = \beta \cdot Y_{\text{unsharp}} = \frac{xr}{Yr} \cdot Y_{\text{unsharp}}$$

Moreover, the following equations are true.

$$\sin\theta = \frac{Cr}{\sqrt{Cb^2 + Cr^2}} \quad \text{[Equation 17]}$$

$$\cos\theta = \frac{Cb}{\sqrt{Cb^2 + Cr^2}}$$

$$Cb_{\text{unsharp}} = r_{\text{unsharp}} \cos\theta = r_{\text{unsharp}} \cdot \frac{Cb}{\sqrt{Cb^2 + Cr^2}}$$

$$Cr_{\text{unsharp}} = r_{\text{unsharp}} \sin\theta = r_{\text{unsharp}} \cdot \frac{Cr}{\sqrt{Cb^2 + Cr^2}}$$

In the manner described above, a color difference signal that does not change the hue corresponding to the luminance can be obtained.

The same calculation is performed to find the color difference signals between other combinations of the six primary colors.

A known technique is used for the processing of the FIR filter and IIR filter in the smoothing means. Thus, the detailed description of the processing will not be particularly given here.

Embodiment 2

As a simpler method, the color difference gain calculation means 4 and the multiplication means 8 may perform the calculation with the following equation 18 where a constant number is set for Cbgain and Crgain:

$$Cb_{\text{unsharp}} = |Y_{\text{diff}}| \cdot (1 + Cb\text{gain}) \cdot (\text{sign of } Y_{\text{diff}}) \cdot Cb$$

$$Cr_{\text{unsharp}} = |Y_{\text{diff}}| \cdot (1 + Cb\text{gain}) \cdot (\text{sign of } Y_{\text{diff}}) \cdot Cr \quad \text{[Equation 18]}$$

It is preferable to set +0.5 for U gain and −0.5 for L gain, for example.

As described above, the image sharpening processing device of the present invention can perform the sharpening processing while changing only luminance without changing a hue by calculating a color difference gain on the basis of a luminance-linked gain.

In addition, the number of line memories can be reduced by use of an IIR filter for previous lines in the smoothing means.

The image sharpening processing device of the present invention may be implemented as a circuit or may be implemented as software causing a computer to execute the image sharpening processing.

Moreover, the present invention is not limited to the aforementioned image sharpening processing device. The present invention may be implemented as an image sharpening processing method used in an image sharpening processing device or as software causing a computer to execute the image sharpening processing method. Further, such software may be provided in the form of being stored in a recording medium or being downloadable via a network such as the Internet.

Industrial Applicability

The present invention is usable as an image sharpening processing device, method, and software.

The invention claimed is:

1. An image sharpening processing device characterized by comprising:
    a smoothing means for smoothing luminance of an input image and thus obtaining a smoothed image;
    a subtraction means for subtracting the smoothed image from the luminance of the input image and thus obtaining a difference image;
    a luminance-linked gain calculation means for calculating a luminance-linked gain from the input image;
    a first multiplication means for multiplying the difference image by the luminance-linked gain and thus obtaining a multiplication result;
    an addition means for adding the multiplication result to the luminance of the input image and thus obtaining luminance of an output image;
    a color difference gain calculation means for calculating a color difference gain from a color difference of the input image and the luminance-linked gain; and
    a second multiplication means for multiplying the color difference of the input image by the color difference gain and thus obtaining a color difference of the output image.

2. The image sharpening processing device according to claim 1, characterized in that the luminance-linked gain calculation means calculates the luminance-linked gain in such a way as to obtain the luminance of the output image in which a U gain is smaller than an L gain.

3. The image sharpening processing device according to one of claims 1 and 2, characterized in that the smoothing means uses an IIR filter for previous lines thereby to use a signal line memory for the previous line, and is set to satisfy $$Newpre = \frac{(cur \cdot N + pre \cdot M)}{M + N}, \quad \text{[Equation 1]}$$

where: cur represents a current line; pre represents a previous line; Newpre represents a new previous line; N represents a ratio of the current line; and M represents a ratio of the previous line.

4. The image sharpening processing device according to claim 1, characterized in that, the luminance-linked gain calculation means calculates gains for all luminance values of the input image.

5. The image sharpening processing device according to claim 1, characterized in that the luminance-linked gain calculation means divides luminance values of the input image into a plurality of segments, sets setting values in the respective segments, and calculates a gain by performing interpolation therebetween.

6. The image sharpening processing device according to claim 1, characterized in that, the color difference gain calculation means calculates a color difference gain in such a way that, in a color space represented by luminance and color difference in which Cb and Cr represent color differences of the input image; Y represents luminance of the input image; $Cb_{unsharp}$ and $Cr_{unsharp}$ represent color differences of the output image; $Y_{unsharp}$ represents luminance of the output image; (x, y) represents a point at which saturation is highest on a straight line passing through (Cb, Cr) and an origin and having the same hue as the input image; (Cb0, Cr0) and (Cb1, Cr1) respectively represent highest saturations of first and second primary colors forming the input image; Y0 and Y1 represent luminance; and θ represents an angle formed by an axis of Cb and the straight line passing through the origin and (Cb, Cr), the following equations are true:

$$y = \frac{Cr1 - Cr0}{Cb1 - Cb0} \cdot (x - Cb0) + Cr0 \quad \text{[Equation 2]}$$

$$y = \frac{Cr}{Cb}x$$

$$\frac{Cr}{Cb}x = \frac{Cr1 - Cr0}{Cb1 - Cb0} \cdot (x - Cb0) + Cr0$$

$$\left(\frac{Cr}{Cb} - \frac{Cr1 - Cr0}{Cb1 - Cb0}\right) \cdot x = -\frac{Cr1 - Cr0}{Cb1 - Cb0} \cdot Cb0 + Cr0$$

$$x = \frac{-\frac{Cr1 - Cr0}{Cb1 - Cb0} \cdot Cb0 + Cr0}{\frac{Cr}{Cb} - \frac{Cr1 - Cr0}{Cb1 - Cb0}}$$

$$= \frac{Cb(-Cr1Cb0 + Cr0Cb0 + Cb1Cr0 - Cb0Cr0)}{Cr(Cb1 - Cb0) - Cb(Cr1 - Cr0)};$$

a ratio at which the point (x, y) divides a line segment (Cb0, Cr0)-(Cb1, Cr1) is expressed by:

$$\text{ratio} = \frac{x - Cb0}{Cb1 - Cb0}; \quad \text{[Equation 3]}$$

luminance Yr at the point (x, y) is expressed by;

$$Yr = Y0 + (Y1 - Y0) \times \text{ratio},$$

then $$\alpha = \frac{Y - 1}{\sqrt{Cb^2 + Cr^2}} \quad \text{[Equation 4]}$$

$$Yr = \alpha \cdot xr + 1$$

$$xr = \frac{Yr - 1}{\alpha} = \frac{(Yr - 1)\sqrt{Cb^2 + Cr^2}}{Y - 1}$$

where $Y > Yr$, or $$\alpha = \frac{Y}{\sqrt{Cb^2 + Cr^2}} \quad \text{[Equation 5]}$$

$$Yr = \alpha \cdot xr$$

-continued $$xr = \frac{Yr}{\alpha} = \frac{Yr\sqrt{Cb^2 + Cr^2}}{Y}$$

where $Y < Yr$;

when $Y_{diff}$ represents a luminance change from the input image to the output image, $$Y_{unsharp} = Y + Y_{diff},$$

then $$\beta = \frac{xr}{1 - Yr} \quad \text{[Equation 6]}$$

$$r_{unsharp} = \beta \cdot (Y_{unsharp} - Yr) + xr$$

where $Y_{unsharp} > Yr$, or $$\beta = \frac{xr}{Yr} \quad \text{[Equation 7]}$$

$$r_{unsharp} = \beta \cdot Y_{unsharp} = \frac{xr}{Yr} \cdot Y_{unsharp}$$

where $Y_{unsharp} < Yr$; and $$\sin\theta = \frac{Cr}{\sqrt{Cb^2 + Cr^2}} \quad \text{[Equation 8]}$$

$$\cos\theta = \frac{Cb}{\sqrt{Cb^2 + Cr^2}}$$

$$Cb_{unsharp} = r_{unsharp}\cos\theta = r_{unsharp} \cdot \frac{Cb}{\sqrt{Cb^2 + Cr^2}}$$

-continued $$Cr_{unsharp} = r_{unsharp}\sin\theta = r_{unsharp} \cdot \frac{Cr}{\sqrt{Cb^2 + Cr^2}}.$$

7. The image sharpening processing device according to claim 1, characterized in that the color difference gain calculation means calculates a color difference gain so as to satisfy:

$$Cb_{unsharp} = |Y_{diff}| \cdot (1 + Cb\text{gain}) \cdot (\text{sign of } Y_{diff}) \cdot Cb$$

$$Cr_{unsharp} = |Y_{diff}| \cdot (1 + Cr\text{gain}) \cdot (\text{sign of } Y_{diff}) Cr \quad \text{[Equation 9]},$$

where, in a color space represented by luminance and color difference, Cb and Cr represent color differences of the input image; $Cb_{unsharp}$ and $Cr_{unsharp}$ represent color differences of the output image; $Y_{diff}$ represents a luminance change from the input image to the output image; and $Cb_{gain}$ and $Cr_{gain}$ represent constant numbers.

8. An image sharpening processing method characterized by comprising the steps of:
   smoothing luminance of an input image and thus obtaining a smoothed image;
   subtracting the smoothed image from the luminance of the input image and thus obtaining a difference image;
   calculating a luminance-linked gain from the input image;
   multiplying the difference image by the luminance-linked gain and thus obtaining a multiplication result;
   adding the multiplication result to the luminance of the input image and thus obtaining luminance of an output image;
   calculating a color difference gain from a color difference of the input image and the luminance-linked gain; and
   multiplying the color difference of the input image by the color difference gain and thus obtaining a color difference of the output image.

9. Software, stored in a non-transitory computer-readable medium, causing a computer to execute the image sharpening processing method according to claim 8.

\* \* \* \* \*